T. L. TALIAFERRO.
APPARATUS FOR COATING COVERS.
APPLICATION FILED OCT. 23, 1912.
1,089,350.
Patented Mar. 3, 1914.
3 SHEETS—SHEET 2.
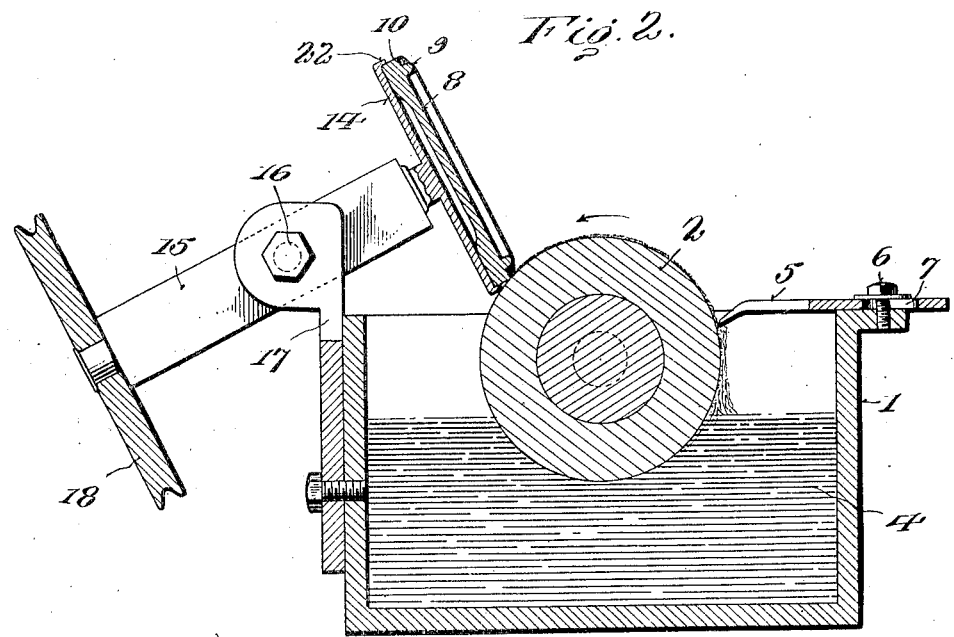
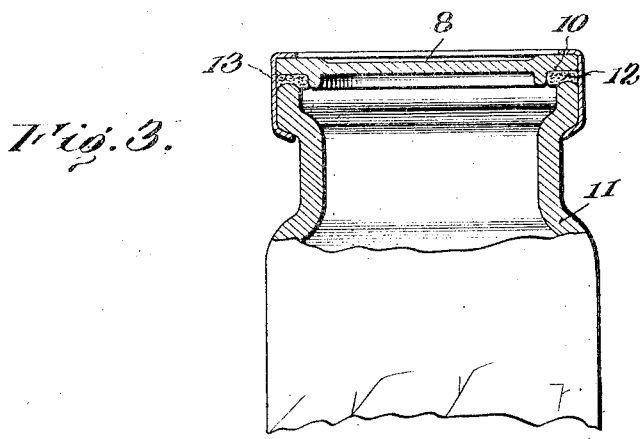

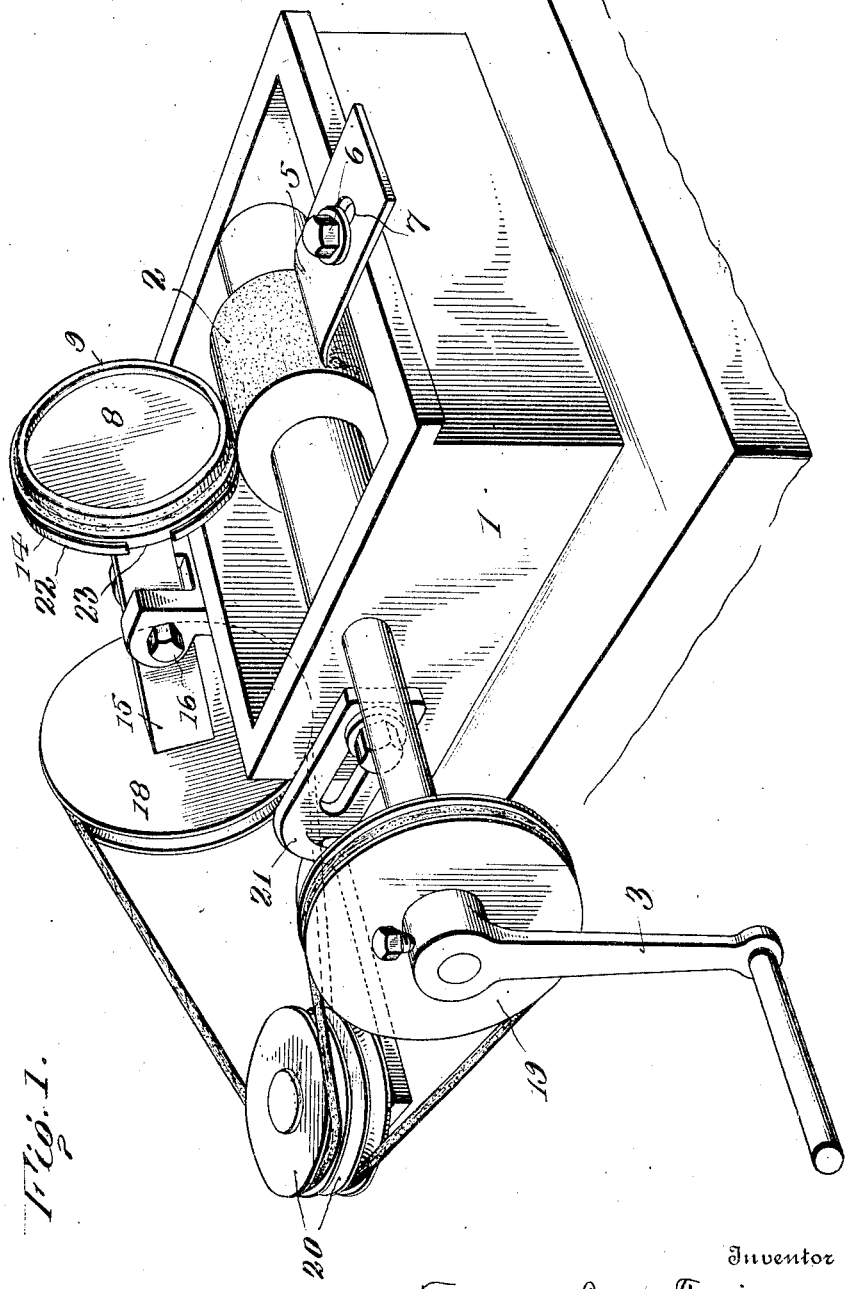

UNITED STATES PATENT OFFICE.

THOMAS LUCIEN TALIAFERRO, OF WHEELING, WEST VIRGINIA, ASSIGNOR, BY MESNE ASSIGNMENTS, TO PHOENIX-HERMETIC COMPANY, OF NEW YORK, N. Y., A CORPORATION OF NEW YORK.

APPARATUS FOR COATING COVERS.

1,089,350.

Specification of Letters Patent. Patented Mar. 3, 1914.

Application filed October 23, 1912. Serial No. 727,470.

*To all whom it may concern:*

Be it known that I, THOMAS LUCIEN TALIAFERRO, a citizen of the United States, residing at Wheeling, in the county of Ohio, State of West Virginia, have invented certain new and useful Improvements in Apparatus for Coating Covers, of which the following is a description, reference being had to the accompanying drawing and to the figures of reference marked thereon.

The invention relates to new and useful improvements in an apparatus for coating covers, and more particularly to glass or porcelain covers.

An object of the invention is to provide a coating apparatus wherein a plastic sealing ring may be formed and deposited on the seating edge of the cover.

A further object of the invention is to provide a plastic sealing ring which is formed in spiral layers, so that a comparatively thick uniform ring is constructed and placed on the seating edge of the cover.

These and other objects will in part be obvious, and will in part be hereinafter more fully described.

Figure 4:
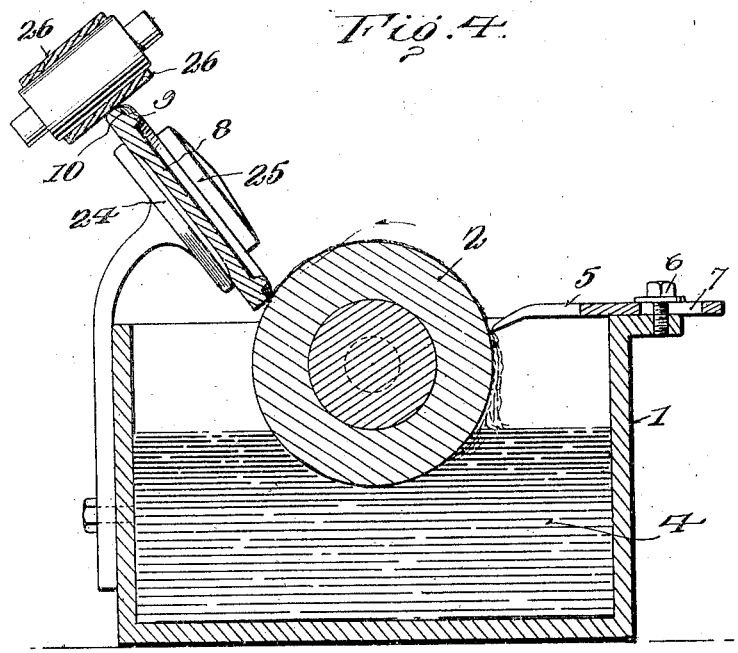
Figure 5:
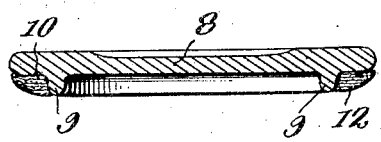

In the drawings, Figure 1 is a perspective view of one form of apparatus which may be used in carrying out the invention; Fig. 2 is a transverse sectional view of the same; Fig. 3 shows one form of can cover having a plastic sealing ring applied thereto by my improved apparatus; Fig. 4 is a transverse sectional view showing a slightly modified form of apparatus for coating the cover.

The invention consists generally of a receptacle for holding the plastic coating material and a carrier which passes through the plastic material, so that the layer of the plastic sealing material is taken up by said carrier. Means are provided which coöperate with the carrier, so that the surplus coating material is removed and a uniform layer left on the carrier. The cover to be coated is presented to the carrier in such a way that the edge of the cover scrapes the coating material from the carrier, and the cover is turned so as to present its entire circumference to the carrier, and thus the coating material is deposited in a spiral layer on the cover. The thickness of the coating on the cover is regulated by the thickness of the coating on the carrier and the number of times the cover is rotated while in contact with the carrier.

Referring more in detail to the drawings, my improved apparatus consists of a receptacle 1, which may be made of any desired construction, and in which is placed the plastic sealing material. I prefer to use a plastic sealing material which includes a volatile solvent, so that said sealing material when deposited upon the cover and dried, will form a plastic sealing ring. It is obvious, however, that other solvents may be used for the sealing materal.

In the present embodiment of the invention a rotating carrier 2, which is in the form of a roll, is mounted in suitable bearings in the side walls of the receptacle 1 and is provided with a crank 3, whereby said roll may be turned. This roll or rotating carrier 2 is so positioned that its lower surface extends into the plastic sealing material 4, as shown in Fig. 2 of the drawings. A scraper or evener 5 is adjustably attached to the upper ledge of the receptacle 1 by a bolt 6, which passes through a slot 7 in said scraper. This scraper or evener may be adjusted relative to the coating roll or carrier, so that the surplus material will be removed from the roll, and a uniform layer left on the roll as it passes from the scraper.

The cover 8 to be coated is preferably of the type which is made of glass or porcelain and is provided with an annular rib 9, spaced from the outer edge of the cover, so as to form an annular groove or seat 10 for the sealing ring. In Fig. 3 I have shown a receptacle 11, to which the cover 8 is applied, and I have also shown the sealing ring 12 as placed on the seat 10, so that when the cover is seated on the body of the receptacle, the sealing ring comes between the edge of the receptacle and the outer edge of the cover. In this form of receptacle the cover is retained by a metallic band 13, which may be of the usual construction. The cover 8 to be coated is placed on the chuck 14, which is mounted to rotate in a sleeve 15, pivoted at 16 to a bracket 17 mounted on the front wall of the coating receptacle. A band wheel 18 is attached to the supporting shaft for the chuck, and is rotated from the band wheel 19 carried by the main shaft supporting the coating roll 2. An idle pulley 20 is utilized for directing the band from the driving wheel on the main shaft to the operating band wheel for the chuck.

While I have shown the band wheel connection for driving the chuck, and a crank for operating the main shaft, it will be understood that these features are merely used for purposes of illustration, and that any desired mechanism may be used for rotating the main shaft and for rotating the chuck in proper timing therewith. The idle pulley 20 is mounted on an adjustable bracket 21, whereby the tension on the driving band may be varied.

As herein shown, the chuck 14 is provided with an annular ledge 22, which forms a seat for the cover. Said ledge may be broken away as at 23, see Fig. 1, to facilitate the removal of the cover from the chuck. This chuck is positioned so that the same rotates in a plane cutting at an angle to the surface of the roll or carrier on which the coating material is presented to the cover. The cover itself also comes into contact with the surface of the roll, and thereby operates to scrape the plastic coating from the coating roll. Inasmuch as the cover is being rotated while the coating roll is rotated, a spiral layer will be deposited in the seating groove 10 of the cover. The thickness of this layer will depend upon the thickness of the coating on the roll, which may be regulated by varying the position of the evener or scraper 5; or the thickness of the coating may be varied by changing the timing of the rotation of the chuck relative to the rotation of the coating roll. Inasmuch as this chuck is continuously rotating, the layer deposited on the cover will be uniform throughout and the sealing ring built up of these spirally laid layers will also be of uniform thickness. The thickness of the finished ring will be determined by the time that the cover is held in contact with the coating roll.

By this apparatus, it will be apparent that I am able to build up a sealing ring of any desired thickness, and to practically fill the entire seating groove formed in the cover. Then again, by my apparatus, wherein the cover scrapes the sealing material from the coating roll, said roll will operate to pack or press the sealing material against the cover. This sealing material, which is adhesive in nature, will adhere, to a certain extent, to the coating roll, and in order to scrape the same therefrom, the material will necessarily pack against the cover. It will, therefore, be seen that I am able to build up a sealing ring of plastic material which is practically solid and of uniform shape and thickness.

I am aware that prior to my invention it has been common to coat metallic covers with a coating roll having a layer of coating material thereon which rotates in contact with the cover, and I do not claim herein such structure. In these coating devices, however, so far as I am aware, the cover is moved in a plane parallel with the axis of rotation of the coating roll, and, therefore, the thickness of the coating material placed upon the cover, depends entirely upon the adhesive strength of the sealing material. In my apparatus, as above described, the sealing material is transferred to the part to be coated by a scraping action, which may cause the sealing material to pile up to any desired thickness, and does not depend upon the adhesive strength of the sealing material.

In Fig. 4 I have shown a slightly modified form of the invention. In this figure the sealing material 4 is placed in the receptacle 1, and is taken up by a carrier or rotating roll 2, as above described. The layer of sealing material on the roll is also made uniform by the evener or scraper 5. In the place of the chuck shown and described in Figs. 1 and 2, I have provided a support 24, which extends along the receptacle from end to end thereof. This support is carried by suitable brackets mounted on the receptacle. The roller 2 is also extended longitudinally, so as to practically reach from end to end of the receptacle. The cover to be coated is placed on the support 24, and will be held thereby at an angle to the direction of travel of the coating surface. A retaining plate 25 may be used to hold the cover on the support 24. A traveling belt 26 is suitably supported and driven, so as to contact with the upper edge of the cover, and cause the same to roll along the roll 2. This rolling of the cover along the roll secures the same function as the rotating of the chuck, as described above. The manner of coating the cover is precisely the same as above noted.

It will be obvious that minor changes in the details of construction and arrangement of parts may be made, without departing from the spirit of the invention, as set forth in the appended claims.

Having thus described my invention, what I claim as new and desire to secure by Letters Patent, is:—

1. An apparatus for applying a coating to covers including a traveling device adapted to carry a layer of coating material, means for supplying a uniform layer of coating material to said traveling device, means for supporting and rotating a cover with its edge in contact with said traveling device and with its surface at an angle to the latter and with said cover in a plane cutting the surface of the traveling device transversely to its direction of movement whereby said cover is caused to scrape said coating material from the traveling device.

2. An apparatus for applying a plastic coating to covers including a traveling device adapted to carry a layer of sealing material, means for supplying a uniform layer of sealing material to said traveling device, means for supporting the cover in a plane cutting the surface of the traveling device at an angle, whereby said cover is caused to scrape the sealing material from the traveling device, and means for turning said cover to present the entire outer circumference thereof to said traveling device.

3. An apparatus for applying a plastic coating to covers, including a coating roll, means for supplying said coating roll with a uniform layer of sealing material, means for supporting the cover in a plane cutting the surface of the coating roll at an angle and in contact therewith, whereby said cover may be caused to scrape the sealing material from said coating roll, and means for turning the cover to present the entire outer circumference thereof to said coating roll.

4. An apparatus for applying a plastic coating to covers including a coating roll, a receptacle for supplying plastic sealing material to said coating roll, a scraper coöperating with said roll for forming a uniform layer of sealing material on said coating roll, a support on which the covers are adapted to rest whereby said covers may be rolled longitudinally of said coating roll and in contact therewith whereby the edges of the covers scrape the coating material from said coating roll, and means for engaging said covers and rolling the same along said support and coating roll.

In testimony whereof, I affix my signature in the presence of two witnesses.

THOMAS LUCIEN TALIAFERRO.

Witnesses:
ALLAN HOWE KELLY,
A. L. METZNER.